United States Patent
Ruell et al.

[11] 3,944,321
[45]* Mar. 16, 1976

[54] RECORDING UNIDIMENSIONAL HOLOGRAMS WITH REDUCED POSITIONAL SENSITIVITY DURING READOUT

[75] Inventors: Hartwig Ruell, Otterfing; Eckhard Storck, Munich, both of Germany

[73] Assignee: Siemens Aktiengesellschaft, Berlin, Germany

[ * ] Notice: The portion of the term of this patent subsequent to May 7, 1991, has been disclaimed.

[22] Filed: Mar. 6, 1974

[21] Appl. No.: 448,497

[30] Foreign Application Priority Data
Mar. 30, 1973 Germany............................ 2316055

[52] U.S. Cl. ....... 350/3.5; 178/6.7 A; 179/100.3 G; 346/108
[51] Int. Cl.² .................................................. G03H 1/28
[58] Field of Search ....................... 350/3.5, 162 SF; 346/107 R, 108; 179/100.3 G; 178/6.7 R

[56] References Cited
UNITED STATES PATENTS
| | | | |
|---|---|---|---|
| 3,770,886 | 11/1973 | Kiemle | 350/3.5 |
| 3,809,453 | 5/1974 | Ruell et al. | 350/3.5 |

*Primary Examiner*—Ronald J. Stern
*Attorney, Agent, or Firm*—Hill, Gross, Simpson, Van Santen, Steadman, Chiara & Simpson

[57] ABSTRACT

An arrangement for effecting holographic recording of information occurring in the form of electrical signals, wherein a coherent object wave which has been pulse modulated by an electrical signal is to be recorded, and a coherent reference wave is used to produce a unidimensional hologram upon a moving photosensitive storage medium, and a divergent reference wave and a convergent object wave, or a convergent reference wave and a divergent object wave, or two convergent reference and object waves or two divergent object and reference waves are used. The present invention defines the equation for the position of the reference and object points so as to provide accuracy in reproducing the holograms.

4 Claims, 2 Drawing Figures

RECORDING UNIDIMENSIONAL HOLOGRAMS WITH REDUCED POSITIONAL SENSITIVITY DURING READOUT

CROSS REFERENCES TO RELATED APPLICATIONS

Allowed patent application entitled "Reduced Positional Sensitivity for Holograms of Electrical Signals", Ser. No. 360,900, filed May 16, 1973 now U.S. pat. No. 3,809,453 which issued May 7, 1974, and in which the inventors are Ruell and Storck, and which has been assigned to the assignee of the present invention, is hereby incorporated by reference.

BACKGROUND OF THE INVENTION

1. Field of the Invention

This invention relates in general to a method for holographic recording of information in the form of electrical signals and then retrieving the information, wherein a coherent object wave, which is pulse modulated, is recorded with a coherent reference wave.

2. Description of the Prior Art

The method of storing information in the form of electrical signals on a light sensitive medium or tape has been known. For instance, it has been proposed to sequentially record electrical signals in the form of one dimensional holograms in which a laser beam is utilized to provide a reference wave and an object wave with the object wave being pulse modulated with the signal to be recorded and the object and refence wave being superimposed on a moving recording medium to record a one dimensional hologram. For retrieval of the information, the storage medium is moved past a reference light source to reconstruct the points of the object wave which directed onto a detector to produce alternating current which after appropriate low-pass filtering corresponds to the original signal.

So as to achieve the highly theoretical maximum possible linear storage density of about $10^3$ bit/mm, the resolution of the reconstituted image points must be as high as possible. This means that the focal spot diameter of the reconstituted image points must be as small as possible. However, this means that the reconstituted image point must have a correspondingly small depth of field and in the limiting instance, this may mean a dimension in the order of magnitude of the wave length of the laser light being used. The storage tape must, therefore, when being reproduced, be guided perpendicularly to the direction of transfer with accuracy in the order of microns so as to provide that the image points are separately received. Particularly where high transfer speeds of the tape are used, this requirement for the accuracy of the guidance of the tape presents a problem.

SUMMARY OF THE INVENTION

As disclosed in allowed application Ser. No. 360,900, referenced above, it has been proposed to use either a convergent object wave and a divergent reference wave, or a divergent object wave and a convergent reference wave; and in either case, these source points of the object and reference waves being disposed in a mirror-symmetrical relationship relative to the hologram plane. This arrangement ensures directional and distance invariance in the reconstituted image point.

In cases in which the source point symmetry cannot be precisely maintained, either for geometric reasons or because several object points have to be stored in parallel, it is essential that the directional invariance be maintained; for even a small lateral displacement of the reconstituted image point is sufficient to produce a collision with the neighboring image points if the storage density is high.

It is an object of the present invention to provide an arrangement of the reference wave source and the object wave source points which ensures at least directional invariance in the reconstituted image points. Source point designates that point from which the object and reference waves emanate or to which they converge.

As shown in allowed patent application 360,900, the reference and object points are located with respect to the center of the hologram such that the two points are located on opposite sides of the storage medium in mirror symmetry and offset from an axis passing through the hologram center. The present invention provides further solution to the problem wherein if the reference wave source point is fixed, the object wave source point would be arranged upon a curve defined by the following equations. Conversely, of course, if the object wave source point is fixed, the reference wave source point would be defined by the following equations.

$$(1) \quad \frac{P_1 P_3}{(P_1^2 + P_2^2 + P_3^2)^{3/2}} + \epsilon \frac{R_1 R_3}{(R_1^2 + R_2^2 + R_3^2)^{3/2}} = 0$$

$$(2) \quad \frac{P_2 P_3}{(P_1^2 + P_2^2 + P_3^2)^{3/2}} + \epsilon \frac{R_2 R_3}{(R_1^2 + R_2^2 + R_3^2)^{3/2}} = 0$$

In one particular example according to the invention, the source point of the divergent wave is placed at the point of intersection between the straight line $P_1 = R_1$ and the curve $$(1) \quad \frac{P_1 P_3}{(P_1^2 + P_2^2 + P_3^2)^{3/2}} + \epsilon \frac{R_1 R_3}{(R_1^2 + R_2^2 + R_3^2)^{3/2}} = 0$$

$$(2) \quad \frac{P_2 P_3}{(P_1^2 + P_2^2 + P_3^2)^{3/2}} + \epsilon \frac{R_1 R_3}{(R_1^2 + R_2^2 + R_3^2)^{3/2}} = 0$$

which is nearer the hologram, and the source point of the convergent wave is positioned so that it is at the intersection which is further from the hologram.

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which:

DESCRIPTION OF THE PREFERRED EMBODIMENTS

Figure 1:
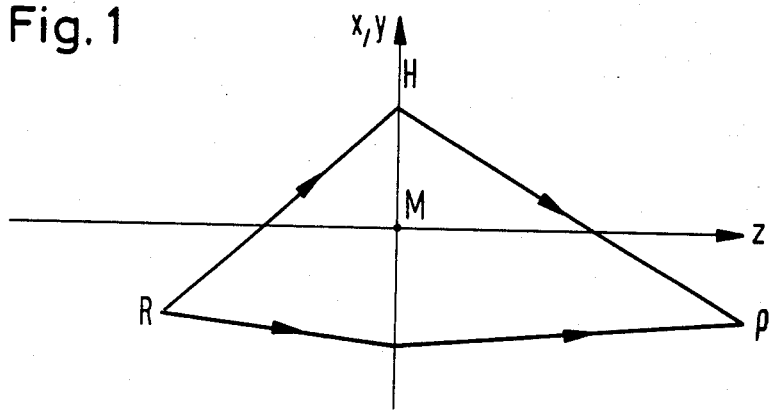
FIG. 1 is a schematic view for recording unidimensional holograms.

FIG. 1 illustrates the hologram H which is to be recorded which lies in the $x-y$ plane. Point R is the source point of the reference wave and P is the source point of the object wave. M is the intersection of the Z axis with the x—y plane. Invariance of translatory motions in the direction of the z axis can be achieved by satisfying the following equations:

(1) $\dfrac{P_1 P_3}{(P_1^2 + P_2^2 + P_3^2)^{3/2}} + \epsilon \dfrac{R_1 R_3}{(R_1^2 + R_2^2 + R_3^2)^{3/2}} = 0$ (2) $\dfrac{P_2 P_3}{(P_1^2 + P_2^2 + P_3^2)^{3/2}} + \epsilon \dfrac{R_2 R_3}{(R_1^2 + R_2^2 + R_3^2)^{3/2}} = 0$ (3) $\dfrac{P_3}{(P_1^2 + P_2^2 + P_3^2)^{3/2}} + \epsilon \dfrac{R_3}{(R_1^2 + R_2^2 + R_3^2)^{3/2}} = 0$ where $\epsilon = +1$ signifies that a divergent wave and a convergent wave are being used, and $\epsilon = -1$ designates that both the waves are either divergent or both are convergent. $P_1$, $P_2$, $P_3$ and $R_1$, $R_2$, and $R_3$ are, respectively, the Cartesian coordinates of the image point P and the reference point R.

Where $P_1$ corresponds to $P_X$, $P_2$ corresponds to $P_Y$, $P_3$ corresponds to $P_Z$, $R_1$ corresponds to $R_X$, $R_2$ corresponds to $R_Y$ and $R_3$ corresponds to $R_Z$. If equations (1) and (2) are satisfied directional invariance will be obtained. If equation (3) is satisfied, invariance in the interval of the image point P, for a given reference point R, will be obtained.

In instances in which the source point symmetry cannot be precisely maintained, either for geometric reasons or because several object points are to be stored in parallel, directional invariance of the image point will be obtained if equations (1) and (2) are satisfied.

In the two-dimensional case where $R_2 = P_2 = 0$, the equations (1) and (2) can be simplifed to (1a) $\dfrac{P_1 P_3}{(P_1^2 + P_3^2)^{3/2}} + \epsilon \dfrac{R_1 R_3}{(R_1^2 + R_3^2)^{3/2}} = 0$ to convert this equation to polar coordinates, the following substitution can be made:

$P_1 = P \sin \omega$, $P_3 = P \cos \omega$, $P = (P_1^2 + P_3^2)^{3/2}$ $\dfrac{\sin \omega \cos \omega}{P} + \epsilon \dfrac{R_1 R_3}{(R_1^2 + R_3^2)^{3/2}} = 0$ or (4) $\dfrac{\sin 2\omega}{2P} = -\epsilon \dfrac{R_1 R_3}{(R_1^2 + R_3^2)^{3/2}}$ For a given R, this is a simple curve for which the following three simple cases can arise:

$A = -\dfrac{R_1 R_3}{(R_1^2 + R_3^2)^{3/2}} < 0$

For $A = 0$, the curve is a straight line which coincides with the Z axis. The cases where $A > 0$ and $A < 0$ are symmetrical to one another; and therefore, it is sufficient to investigate the case of $A > 0$.

Figure 2:
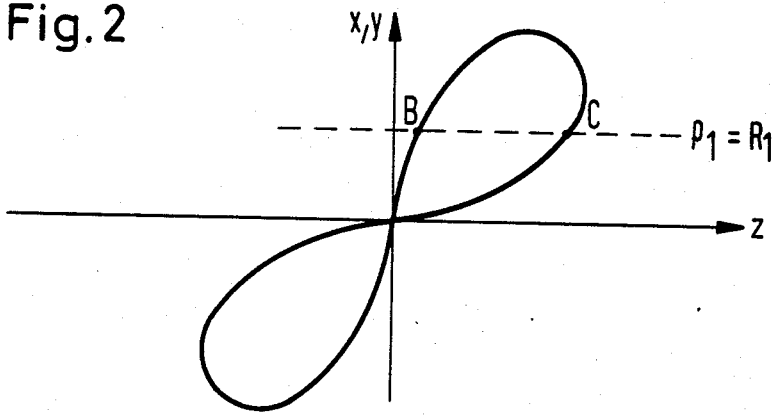
FIG. 2 is a plot for the geometric location of the object wave source points for a given reference wave source point.

FIG. 2 illustrates the curve determined by equation (4) for the case where $A > 0$. If, in addition to a directional invariance, distance invariance on the part of the image point is required, then the intersections of this curve must be determined by using equation (3). In other words, the two dimensional case $\dfrac{P_3}{(P_1^2 + P_3^2)^{3/2}} + \epsilon \dfrac{R_3}{(R_1^2 + R_3^2)^{3/2}} = 0$ That is by combining equation (1a) the intersections with the straight line $P_1 = R_1$ which will generally produce two intersections, points B and C illustrated in FIG. 2 with one of these points being symmetrical with the source point. Convergent object waves having large apertural angle, can only be produced with a limited aperture ratio. On the other hand, source point symmetry requires that both the object source point and the reference source point have the same distance or interval so that even the divergent reference wave can only be exploited for a limited aperture ratio. The resolution in the image space, and therefore the storage density, is proportional, however, to the sum of the aperture ratios of the object wave and the reference wave. Since there are two intersection points B and C in an example in accordance with the invention, the reference wave point source is arranged symmetrically at the intersection point B nearer to the hologram and the object wave source point is arranged symmetrically at the intersection point C which is disposed further away from the hologram.

We have found that compared with the case in which the refence wave source point is disposed symmetrically at the intersection point located further from the hologram, that the storage density can be increased by a factor of about 2 by placing the reference wave source point at the intersection point B nearer to the hologram.

It is seen that this invention provides a method for increasing the storage capacity in a storage medium for holograms by arranging the reference and object wave point sources in accordance with the equations defined herein thus allowing increased storage capacity. Although it has been described with respect to preferred embodiments, it is not to be so limited as changes and modifications may be made which are within the full intended scope as defined by the appended claims.

We claim as our invention:

1. A method for holographic recording of information received in the form of electrical signals wherein a coherent object wave pulse-modulated by the electrical signal interferes with a coherent reference wave to produce a unidimensional hologram upon a moving photosensitive storage medium wherein said coherent object wave and said coherent reference wave each have spherical wave fronts at the hologram storage medium, said object wave front having an origin at a point P and said reference wave front having an origin at a point R wherein the reference wave source point R and object wave source point P are related by and lie on the following curve, defined by the following equations:

$\dfrac{P_1 P_3}{(P_1^2 + P_2^2 + P_3^2)^{3/2}} + \epsilon \dfrac{R_1 R_3}{(R_1^2 + R_2^2 + R_3^2)^{3/2}} = 0$ $\dfrac{P_2 P_3}{(P_1^2 + P_2^2 + P_3^2)^{3/2}} + \epsilon \dfrac{R_2 R_3}{(R_1^2 + R_2^2 + R_3^2)^{3/2}} = 0$ wherein $P_1$, $P_2$, $P_3$ and $R_1$, $R_2$, $R_3$, respectively, are the Cartesian coordinates of the image point P and the reference point R and $\epsilon$ is plus one if a divergent wave and convergent wave are being used and is minus one if both waves are divergent or both are convergent where the photosensitive storage medium being located on the "1–2 plane" and centered about the "3 axis".

2. A method according to claim 1, wherein said curve is generally a figure eight and a line defined by $P_1 = R_1$ is a straight line which intersects said curve at two points with the point closest to the hologram defining the source point of the reference wave and the point furthest from the hologram defining the source point of the object wave.

3. The method of claim 2, wherein both of said points are on the same side of the hologram.

4. The method of claim 3, wherein both of said points are the same distance measured on normals to said hologram storage medium.

* * * * *